(12) United States Patent  (10) Patent No.: US 9,042,942 B2
Jeong et al.  (45) Date of Patent: May 26, 2015

(54) METHOD AND APPARATUS FOR DISPLAYING HOME SCREEN IN MOBILE TERMINAL

(75) Inventors: Yong-Soo Jeong, Seoul (KR); Jin Park, Gyeonggi-do (KR); Min-Ji Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 19 days.

(21) Appl. No.: 13/487,536

(22) Filed: Jun. 4, 2012

(65) Prior Publication Data
US 2012/0309433 A1 Dec. 6, 2012

(30) Foreign Application Priority Data
Jun. 3, 2011 (KR) .................. 10-2011-0053907

(51) Int. Cl.
*H04B 1/38* (2006.01)
*H04M 1/725* (2006.01)

(52) U.S. Cl.
CPC ...... *H04M 1/72583* (2013.01); *H04M 1/72572* (2013.01); *H04M 1/72586* (2013.01); *H04M 2250/10* (2013.01)

(58) Field of Classification Search
USPC .................. 455/566, 67.7, 226.4, 456.1–457, 455/414.1–414.3; 715/864, 763, 762, 810, 715/789
See application file for complete search history.

(56) References Cited

U.S. PATENT DOCUMENTS

| | | | | |
|---|---|---|---|---|
| 5,367,626 | A * | 11/1994 | Morioka et al. | 715/837 |
| 8,340,726 | B1 * | 12/2012 | Fujisaki | 455/566 |
| 8,351,992 | B2 * | 1/2013 | Strom | 455/566 |
| 8,559,931 | B2 * | 10/2013 | Moon et al. | 455/414.2 |
| 2007/0271527 | A1 * | 11/2007 | Paas et al. | 715/810 |
| 2008/0146245 | A1 | 6/2008 | Appaji | |
| 2009/0199122 | A1 * | 8/2009 | Deutsch et al. | 715/771 |
| 2009/0215497 | A1 | 8/2009 | Louch | |
| 2010/0085317 | A1 * | 4/2010 | Park et al. | 345/173 |
| 2011/0034129 | A1 | 2/2011 | Kim et al. | |
| 2011/0047510 | A1 * | 2/2011 | Yoon | 715/835 |
| 2011/0185283 | A1 * | 7/2011 | Jun et al. | 715/745 |
| 2012/0165071 | A1 * | 6/2012 | Hsu et al. | 455/557 |
| 2013/0002706 | A1 * | 1/2013 | Rezende et al. | 345/619 |
| 2013/0326415 | A1 * | 12/2013 | Park | 715/835 |
| 2014/0139475 | A1 * | 5/2014 | Wada | 345/173 |
| 2014/0201655 | A1 * | 7/2014 | Mahaffey et al. | 715/765 |

FOREIGN PATENT DOCUMENTS

| | | |
|---|---|---|
| EP | 1 513 329 | 3/2005 |
| GB | 2 444 306 | 6/2008 |
| KR | 1020090076648 | 7/2009 |
| KR | 1020100043613 | 4/2010 |

* cited by examiner

*Primary Examiner* — Sharad Rampuria
(74) *Attorney, Agent, or Firm* — The Farrell Law Firm, P.C.

(57) ABSTRACT

A method for displaying a home screen in a mobile terminal includes determining a location of the mobile terminal, determining a screen associated with the determined location among multiple screens; and setting the screen associated with the determined location as a home screen.

16 Claims, 6 Drawing Sheets

METHOD AND APPARATUS FOR DISPLAYING HOME SCREEN IN MOBILE TERMINAL

PRIORITY

This application claims priority under 35 U.S.C. §119(a) to a Korean Patent Application filed in the Korean Intellectual Property Office on Jun. 3, 2011 and assigned Serial No. 10-2011-0053907, the contents of which are incorporated herein by reference.

BACKGROUND OF THE INVENTION

1. Field of the Invention

The present invention relates generally to a method for displaying a home screen in a mobile terminal, and more particularly, to a method for adaptively displaying a home screen of a mobile terminal depending on the location of the mobile terminal.

2. Description of the Related Art

Mobile terminals such as smart phones and tablet Personal Computers (PCs) provide many useful features or functions to users with a wide variety of applications, evolving into devices capable of allowing the users to enjoy various types of services in addition to conventional voice calls.

The growing diversity of the functions implemented in the mobile terminal logically causes an increase in the number of types of applications capable of selecting and executing these functions. The more the user installs applications in his mobile terminal, the more the icons for running the applications will be displayed on one or more screens of the mobile terminal.

Given the size limitation of the display due to the portability of the mobile terminal, it is difficult to display, on a single screen, all icons of applications installed in the mobile terminal with a display having a limited size.

Conventionally, to address these and other problems, multiple screens are provided and icons of applications are placed on the individual screens, making it possible to switch screens as needed and run a specific application.

The conventional screen display methods will be described with reference to FIGS. 1A and 1B, on the assumption that 6 icons may be placed on each screen, and 3 screens are generated as the user creates 18 icons by installing 18 applications.

Referring to FIG. 1A, a user places icons 11 to 16 on a screen 10, icons 21 to 26 on a screen 20, and icons 31 to 36 on a screen 30. This conventional screen display method places icons of many applications on multiple screens 10 to 30, making it possible to install many applications even in a mobile terminal having a small display. However, if the number of applications installed in the mobile terminal increases causing an increase in the number of icons of the installed applications, it is difficult for the user to remember the screen on which is placed the icon of an application he desires to run. Therefore, the user must search for the icon by inconveniently switching between the screens.

To cure this problem, another conventional screen display method has been provided and will be described below with reference to FIG. 1B.

Generally, when multiple screens are provided, the conventional screen display method switches to the previous or next screen from the current screen if a screen switch key is input, or if a touch toward a specific direction, such as left or right, is input on the current screen.

Referring to FIG. 1B, a user may request a switch to a screen 20 by performing a touch input, such as a drag input, toward the left on the current screen 10. Thereafter, the user may request a switch to a screen 30 (the next screen following the new current screen 20) by performing a touch input toward the left on the current screen 20, or may request a switch back to the screen 10 (the screen preceding the new current screen 20) by performing a touch input to the right on the current screen 20.

The order of screen display is screen 10, followed by screen 20 and then screen 30. Thus, screen 10 displayed first is called a home screen, and icons of frequently used applications are placed on the home screen, for the sake of convenience. Therefore, the user may quickly switch to the home screen by performing an appropriate key input on the current non-home screen.

For example, the mobile terminal may quickly switch to the screen 10 (i.e., a home screen) if a switch key to a home screen is input on the current screen 30. An indication window 40 indicates the number (e.g., 3) of screens created in the mobile terminal, and also indicates the display order of the current screen among all the screens, using graphic effects 41, 42 and 43. In other words, because the screen 10 corresponds to a home screen, the graphic effect 41 indicates that the display order of the screen 10 is 'first', the graphic effect 42 indicates that the display order of the screen 20 is 'second', and the graphic effect 43 indicates that the display order of the screen 30 is 'third'.

This conventional screen display method may promote rapid switching to the home screen on which icons of frequently used applications are placed. However, only one home screen is provided and the number of icons of applications capable of being placed on the home screen is limited, causing inconvenience to the user. Therefore, a need exists in the art to cure the aforementioned inconveniences caused by the conventional screen display method.

SUMMARY OF THE INVENTION

An aspect of the present invention is to provide a method for providing several home screens including icons of applications appropriate for user's situations, to cure the shortcomings of the conventional screen or home screen display methods.

In accordance with an aspect of the present invention, there is provided a method for displaying a home screen in a mobile terminal, in which a location of the mobile terminal is determined, a screen associated with the determined location among multiple screens is determined, and the screen associated with the determined location is set as a home screen.

BRIEF DESCRIPTION OF THE DRAWINGS

The above and other aspects, features and advantages of embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Figure 1A:
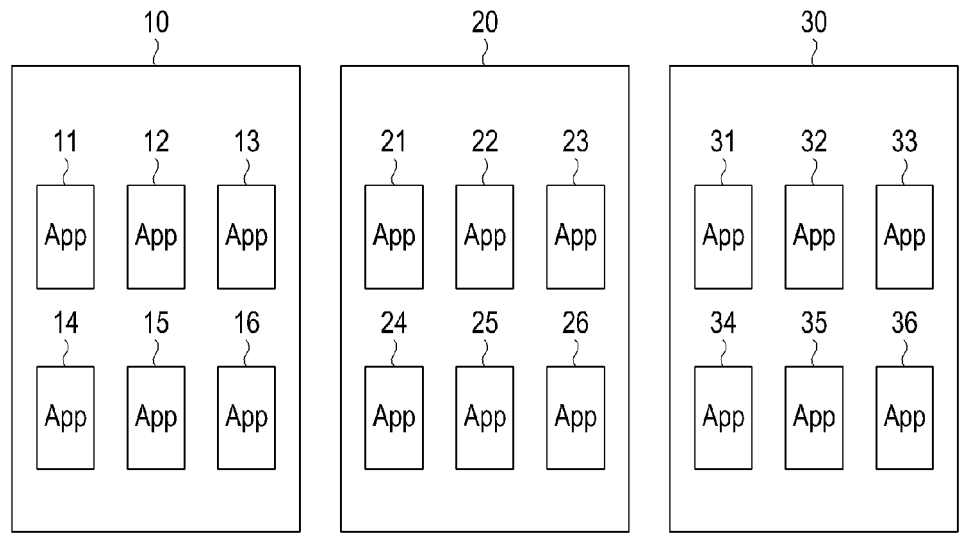
FIGS. 1A and 1B illustrate a screen display method according to the prior art.
Figure 1B:
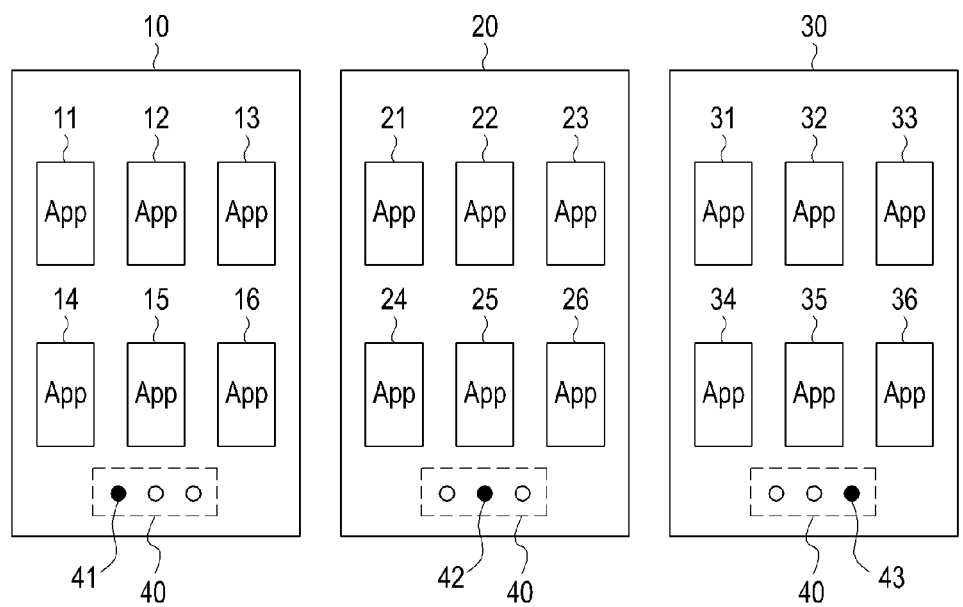

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for the sake of clarity and conciseness.

A mobile terminal, to which an embodiment of the present invention is applicable, may include a video phone, a cell phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book, a portable computer, such as a notebook computer or a tablet PC, or a digital camera. The mobile terminal will be described with reference to FIG. 2.

A wireless transceiver 223 includes a Radio Frequency (RF) unit (not shown) and a modem (not shown). The RF unit includes an RF transmitter for frequency up-converting transmission signals and amplifying the up-converted signals, and an RF receiver for low-noise-amplifying received signals and frequency down-converting the amplified signals. The modem includes a signal transmitter for encoding and modulating transmission signals, and a signal receiver for demodulating and decoding signals received from the RF unit.

An audio processor 225 may include a codec (not shown). The codec includes a data codec and an audio codec. The data codec processes data signals such as packet data, and the audio codec processes audio signals such as voice and multimedia files. The audio processor 225 converts digital audio signals received from the modem into analog signals by means of the audio codec, and plays the analog audio signals using a speaker (SPK). The audio processor 225 converts analog audio signals received by a microphone (MIC) into digital audio signals by means of the audio codec, and transfers the digital audio signals to the modem. The codec may be provided individually, or may be included in a controller 210.

A key input unit 227 includes alphanumeric keys for inputting numeric and character information, and function keys for setting various functions. The key input unit 227 may include a touch pad on which the alphanumeric keys and the function keys are provided. If a display 250 includes a touch screen such as a capacitive or a resistive touch screen, the key input unit 227 may include a limited minimum number of keys, and the display 250 may partially replace the key input function of the key input unit 227.

Using the key input unit 227, a user may request a switch from the current screen to the home screen by performing a key input, such as by inputting a specific key to display the home screen.

A memory 230 may include a program memory and a data memory. The program memory stores a program for controlling the general operation of the mobile terminal. The memory 230 may further include an external memory such as Compact Flash (CF), Secure Digital (SD), Micro Secure Digital (Micro-SD), Mini Secure Digital (Mini-SD), Extreme Digital (xD), and memory stick. Also, the memory 230 may include a disk such as Hard Disk Drive (HDD) and Solid State Disk (SSD).

In the memory 230, the moving path of the mobile terminal may be stored in the form of a DataBase (DB). Considering the privacy of the user, whether to store the moving path of the mobile terminal may be determined depending on user settings.

A Global Positioning System (GPS) module 240 provides the current location information of the mobile terminal by receiving a GPS signal and acquiring a longitude value and a location value for the current position of the mobile terminal. The GPS module 240 may be replaced by or used together with a separate hardware or software module capable of providing location information of the mobile terminal. The function of the GPS module 240, for providing location information of the mobile terminal, may be replaced by or used together with a function of determining the location using the triangulation that may be performed in cooperation with the wireless transceiver 223 and a base station (not shown).

The location of the mobile terminal may be measured or determined using the GPS module 240 to more accurately determine the location of the mobile terminal.

The display 250 may include Liquid Crystal Display (LCD) or Organic Light Emitting Diode (OLED), which may be classified into Passive Matrix OLED (PMOLED) and Active Matrix OLED (AMOLED). The display 250 outputs display information generated in the mobile terminal. When including a touch screen such as a capacitive or a resistive touch screen, the display 250 may serve as an input unit for controlling the mobile terminal together with the key input unit 227.

The display 250 displays screens, on each of which is displayed icons of applications and various user-desired content such as folders, original copies of specific multimedia files, and shortcut icons.

The display 250 displays screens associated with different locations of the mobile terminal, such as home (i.e., the user's home), public transportation, and work (i.e., the user's place of employment), and on each screen may be displayed a folder(s) in which a group of icons of similar applications is stored.

The controller 210 controls the overall operation of the mobile terminal, and may control a screen switching operation of the mobile terminal depending on user inputs received from the key input unit 227 and/or the display 250. The controller 210 controls an operation of determining the location of the mobile terminal, determining a screen associated with the determined location among multiple screens, and setting the screen associated with the determined location as a home screen. A detailed operation of the controller 210 will be described below.

Figure 2:
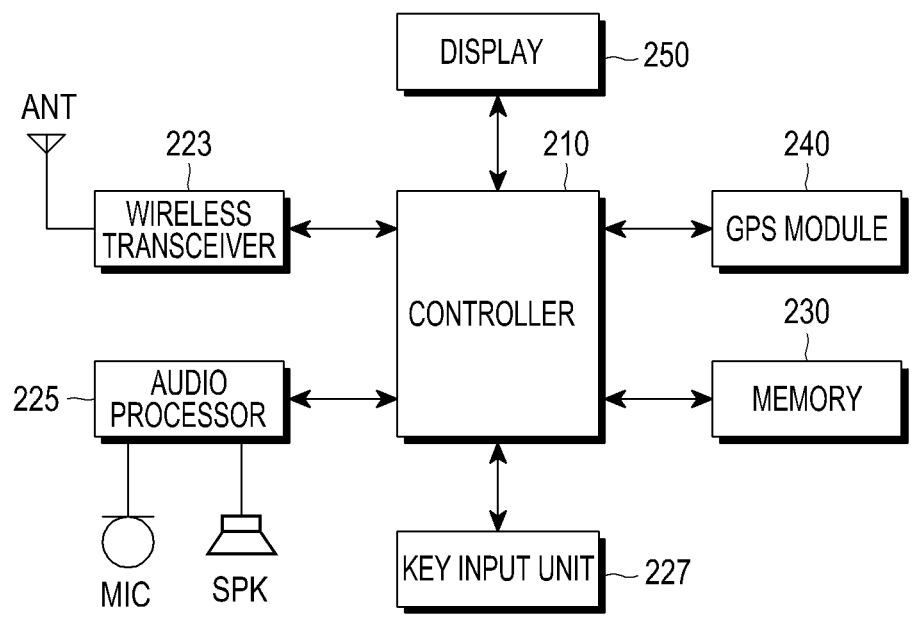
FIG. 2 illustrates a structure of a mobile terminal according to an embodiment of the present invention.

Although devices mountable in the mobile terminal such as a Bluetooth® module, a camera module, a Wi-Fi module, an acceleration sensor, a proximity sensor, a gyroscope sensor, and a Digital Media Broadcasting (DMB) receiver module are not shown in the block diagram of FIG. 2, it will be understood by those of ordinary skill in the art that these devices may be mounted in the mobile terminal to provide the associated functions.

For example, the acceleration sensor may detect motion of the mobile terminal by measuring dynamic power such as acceleration, vibration and shock, and the detected motion may be used to detect a display direction of the mobile terminal display. The proximity sensor detects a part of the user's body, which approximates to the mobile terminal, and may be used to prevent malfunction of the mobile terminal providing the touch screen function. The gyroscope sensor monitors the dynamic movement of the rotating mobile terminal, and may be used to detect rotational motions of the 6 axes (i.e., top-bottom, left-right, forward-reverse, x-axis, y-axis, and z-axis) of the mobile terminal in association with the acceleration sensor. The camera module may allow a user to capture a photo (video or still image), and the location information that is acquired using the GPS module 240 during photo capturing, may be inserted in the captured photo.

Figure 3:
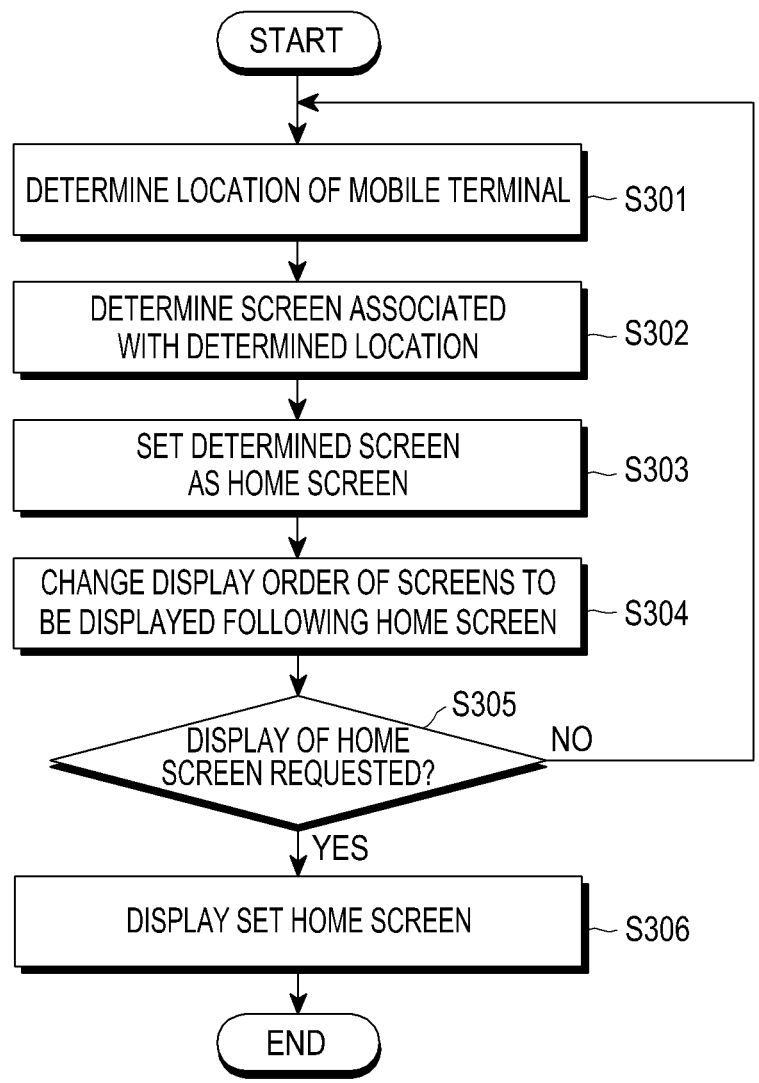
FIG. 3 illustrates a process of displaying a home screen according to an embodiment of the present invention.
Figure 5A:
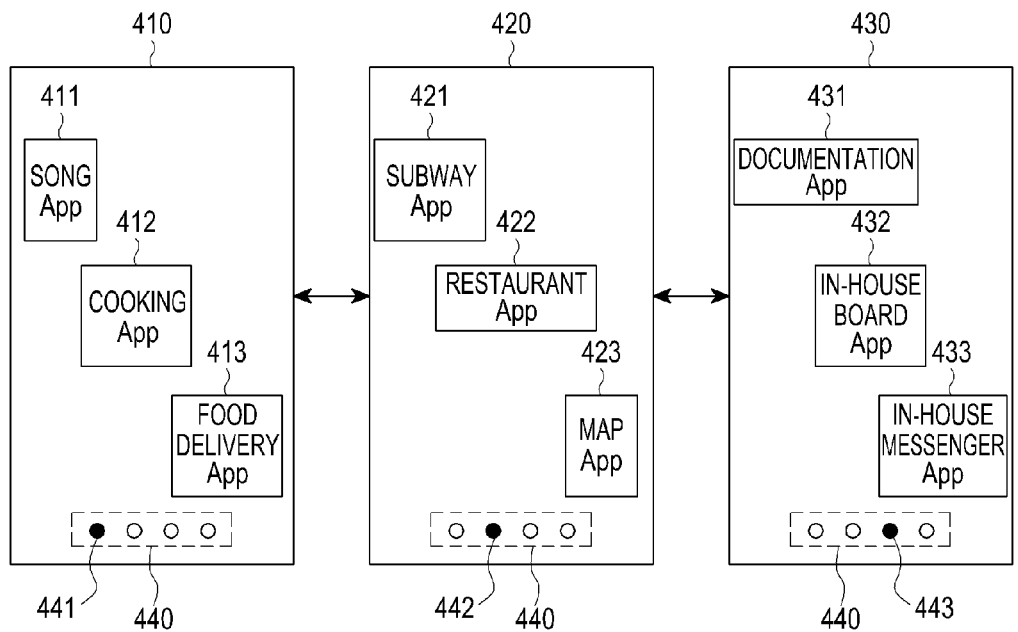
FIGS. 5A and 5B illustrate a second example of a process of displaying a home screen according to an embodiment of the present invention.
Figure 5B:
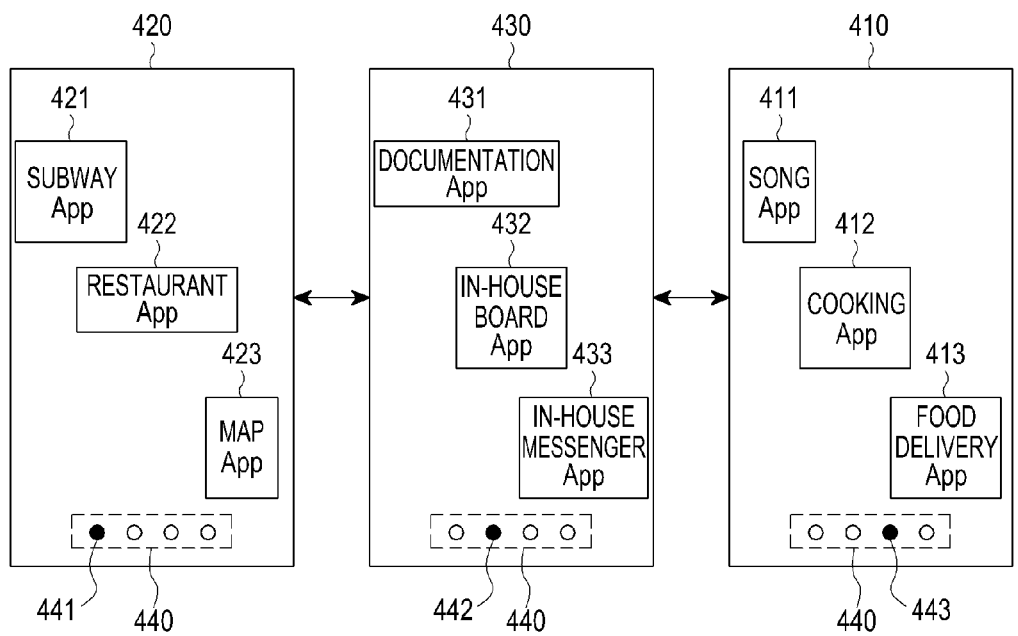
Figure 6:
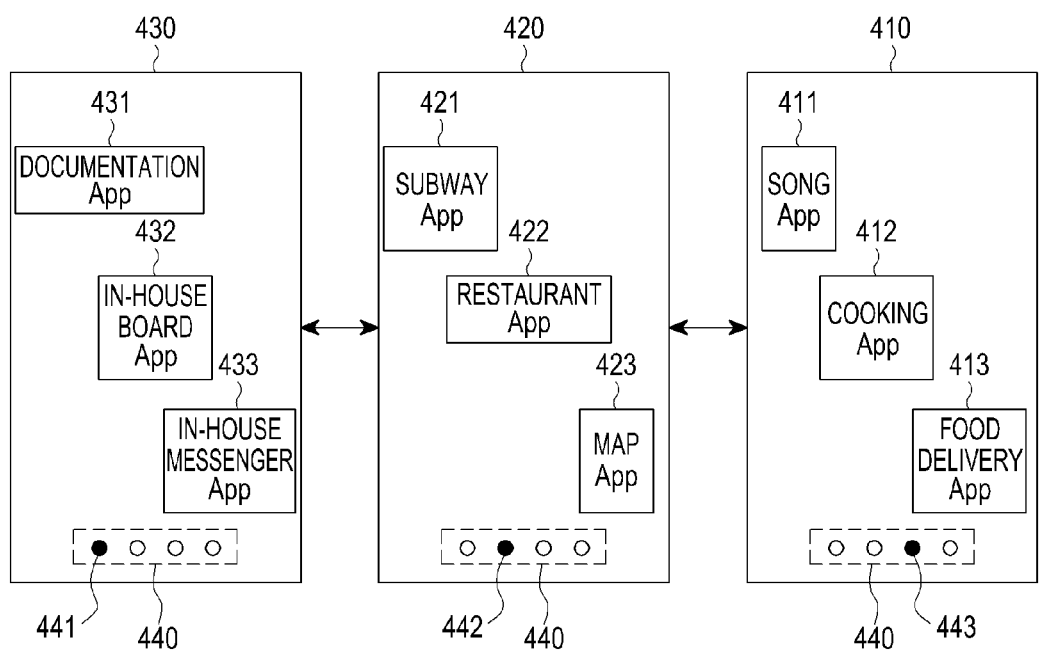
FIG. 6 illustrates a third example of a process of displaying a home screen according to an embodiment of the present invention.

FIG. 3 illustrates a process of displaying a home screen according to an embodiment of the present invention, and FIGS. 4 to 6 illustrate first to third examples of a process of displaying a home screen according to an embodiment of the present invention, respectively.

In steps S301 and S302 of FIG. 3, the controller 210 determines a location of the mobile terminal and determines a screen associated with the determined location of the mobile terminal, respectively.

Figure 4A:
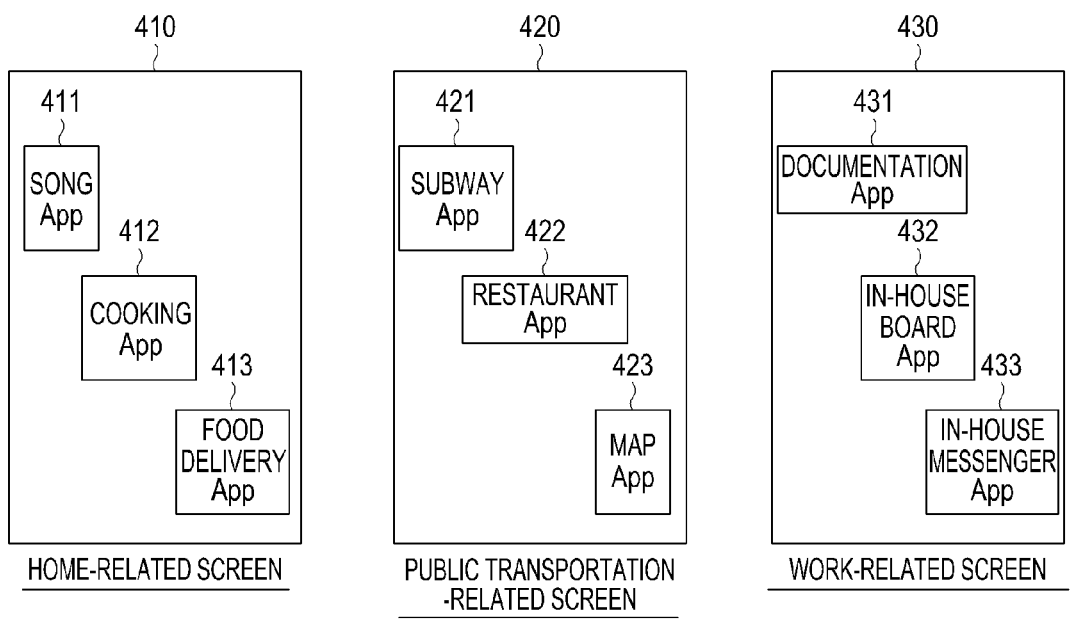
FIGS. 4A and 4B illustrate a first example of a process of displaying a home screen according to an embodiment of the present invention.

Screens associated with locations of the mobile terminal will be described first with reference to FIGS. 4A and 4B. As illustrated in FIG. 4A, a user may request generation of screens 410, 420 and 430 associated with locations of the mobile terminal.

The locations of the mobile terminal may be classified into home, public transportation and work. The user may place, on the screen 410, icons of applications that the user desires to use at home. The user may place, on the screen 420, icons of applications desired for use on public transportation. The user may place, on the screen 430, icons of applications desired for use at work. The controller 210 stores, in the memory 230, values that are set by the user for the screens associated with the locations of the mobile terminal.

The screen 410 represents a case in which the location of the mobile terminal is home, and on the screen 410 are placed icons 411, 412 and 413 of applications that the user frequently uses at home. The screen 420 represents a case in which the location of the mobile terminal is public transportation, and on the screen 420 are placed icons 421, 422 and 423 of applications that the user frequently uses while on public transportation. The screen 430 represents a case in which the location of the mobile terminal is work, and on the screen 430 are placed icons 431, 432 and 433 of applications that the user frequently uses while at work.

After placing icons on the screens associated with the locations of the mobile terminal, the controller 210 stores the screen settings in the memory 230. If a function of providing screens associated with the locations of the mobile terminal is activated, the controller 210 periodically determines the location of the mobile terminal using the GPS module 240. The function of providing screens associated with the locations of the mobile terminal may be activated or inactivated depending on user settings.

If the location of the mobile terminal is determined while the function of providing screens associated with the locations of the mobile terminal is activated, the controller 210 determines a screen associated with the determined location of the mobile terminal from the memory 30, such as screen setting data.

Although the user directly places icons of frequently used applications on screens associated with the locations of the mobile terminal in FIG. 4A, this embodiment may be modified for the sake of user convenience.

For example, the controller 210 may store in a separate DB the types and number of runs of frequently used applications associated with the locations of the mobile terminal.

When screens associated with the locations of the mobile terminal are generated, the controller 210 may automatically place on the screens the icons of the applications that are frequently run (i.e., at least a set number of times) in the locations associated with the screens.

The controller 210 may recommend to the user the icons of the applications that are frequently run in a specific location, to place them on a screen associated with the specific location.

For example, the icons 411, 412 and 413 placed on the screen 410 may not be directly placed by the user. Instead, icons of applications the user frequently runs when the mobile terminal is located at home may be automatically placed by the controller 210.

The controller 210 may receive set values for the screens associated with locations of the mobile terminal from a specific external device, and store them in the memory 230.

For example, the controller 210 may receive layout settings for screens 410, 420 and 430 and icons thereof from a web server, an in-house server, or other mobile terminals. If the mobile terminal were located at work during a later time, the controller 210 may set the screen 430 associated with the location (i.e., work) of the mobile terminal, received from the external device such as the in-house server, as a home screen.

In step S303, the controller 210 sets the screen associated with the determined location of the mobile terminal as a home screen.

The controller 210 determines the location of the mobile terminal and whether a screen associated with the current location of the mobile terminal is present, and if a screen associated with the current location of the mobile terminal is present, the controller 210 sets the screen as a home screen.

Upon receiving a request for displaying a home screen from the user, the controller 210 may display a home screen appropriate for the current location of the mobile terminal, allowing the user to conveniently check and run the applications usefully available in the current location.

For example, if the current location of the mobile terminal is home, the controller 210 sets the screen 410 associated with the home as a home screen as illustrated in FIG. 5A. If the screen associated with the home is set as a home screen, the user may determine from an indicator 441 in FIG. 5A that the screen associated with the home has become a first screen in display order among all 4 mobile terminal screens indicated by reference numeral 440.

If the current location of the mobile terminal is public transportation, the controller 210 sets the screen 420 associated with the public transportation as a home screen as illustrated in FIG. 5B. If the screen associated with the public transportation is set as a home screen, the user may determine from the indicator 441 in FIG. 5B that the screen associated with the public transportation has become the first screen in display order among all 4 screens of the mobile terminal.

If the current location of the mobile terminal is work, the controller 210 sets the screen 430 associated with the company as a home screen as illustrated in FIG. 6. If the screen associated with work is set as a home screen, the user may determine from the indicator 441 in FIG. 6 that the screen associated with the company has become a first screen in display order among all 4 screens of the mobile terminal.

In step S304, the controller 210 changes the display order of screens to be displayed following the home screen.

Through step S304, an embodiment of the present invention provides an additional function as well as the function of allowing the user to quickly use or run applications needed in the current location on the home screen by setting the screen associated with the current location of the mobile terminal as a home screen.

In other words, after setting the screen associated with the current location of the mobile terminal as a home screen, the controller 210 changes the display order of the remaining screens except for the home screen taking into account the moving path of the mobile terminal. It is assumed that as illustrated in FIG. 4B, the user of the mobile terminal has a moving path from home to work using public transportation to work, and returns home from work using public transportation. The controller 210 may track the moving path using the GPS module 240 and store it in a separate DB.

Figure 4B:

If the screen associated with the home is set as a home screen as illustrated in FIG. 5A, the controller 210 sets the display order of the screen associated with public transportation as the display order following the home screen (i.e., the screen 410 associated with home), determining that the location of the mobile terminal will move from home to public transportation, based on the moving path illustrated in FIG. 4B.

Assuming that after the public transportation, the location of the mobile terminal will move to work, the controller 210 sets the display order of the screen associated with work as the display order following the screen associated with public transportation, or as the second display order from the home screen. Therefore, if the screen 410 associated with home is set and displayed as a home screen, the user may conveniently and quickly receive and run applications needed in the next location (i.e., public transportation or work) on the moving path of the mobile terminal.

In FIG. 5A, since the screen associated with home is set as a home screen, the user may determine from the indicator 441 that the display order of the screen associated with home is the first display order. In addition, the user may determine from the indicators 442 and 443 that the display orders of the screens associated with public transportation and work are the second and third display orders, respectively.

If the screen 420 associated with the public transportation is set as a home screen as illustrated in FIG. 5B, the controller 210 sets the display order of the screen associated with the company as the display order following the home screen (i.e., the screen 420 associated with public transportation), assuming that the location of the mobile terminal will move from public transportation to work, based on the moving path illustrated in FIG. 4B. The controller 210 changes the display order of the remaining screen associated with home as the display order following the screen associated with work. If the screen 420 associated with the public transportation is set and displayed as a home screen, the user may conveniently and quickly receive and run applications needed in the next location (i.e., work or home) on the moving path of the mobile terminal.

In FIG. 5B, since the screen associated with public transportation is set as a home screen, the user may determine from the indicator 441 that the display order of the screen associated with public transportation is the first display order. In addition, the user may determine from the indicators 442 and 443 that the display orders of the screens associated with work and home are the second and third display orders, respectively.

If the screen associated with the company is set as a home screen as illustrated in FIG. 6, the controller 210 sets the display order of the screen associated with public transportation as the display order following the home screen (i.e., the screen 430 associated with work), assuming that the user of the mobile terminal will return home from work using public transportation, based on the moving path illustrated in FIG. 4B. The controller 210 changes the display order of the screen associated with home as the display order following the screen associated with public transportation.

In FIG. 6, since the screen associated with work is set as a home screen, the user may determine from the indicator 441 that the display order of the screen associated with work is the first display order. In addition, the user may determine from the indicators 442 and 443 that the display orders of the screens associated with public transportation and home are the second and third display orders, respectively.

As described above, through step S303, an embodiment of the present invention may provide the function of allowing the user to quickly use or run applications needed in the current location on the home screen by setting the screen associated with the current location of the mobile terminal as a home screen. Therefore, step S304 of changing the display order of screens to be displayed following the home screen may be omitted depending on the embodiment of the present invention.

In steps S305 and S306, the controller 210 displays the set home screen upon receiving a request for displaying a home screen.

After a home screen is set and the display order of screens to be displayed following the home screen is changed through steps S301 to S304, the controller 210 displays the set home screen upon receiving a request for displaying a home screen.

As an example, if it is determined that the location of the mobile terminal is home and a request for displaying a home screen is received, the controller 210 displays the home screen 410 (i.e., a screen associated with home) as illustrated in FIG. 5A based on the moving path illustrated in FIG. 4B. Thereafter, upon receiving a request for displaying screens to be displayed following the current home screen 410, the controller 210 displays the screen 420 associated with public transportation as illustrated in FIG. 5A.

As another example, if it is determined that the location of the mobile terminal is public transportation and a request for displaying a home screen is received, the controller 210 displays the home screen 420 (i.e., a screen associated with public transportation) as illustrated in FIG. 5B based on the moving path illustrated in FIG. 4B. Thereafter, upon receiving a request for displaying screens to be displayed following the current home screen 420, the controller 210 displays the screen 430 associated with work as illustrated in FIG. 5B.

As a further example, if it is determined that the location of the mobile terminal is work and a request for displaying a home screen is received, the controller 210 displays the home screen 430 (i.e., a screen associated with work) as illustrated in FIG. 6 based on the moving path illustrated in FIG. 4B. Thereafter, upon receiving a request for displaying screens to be displayed following the current home screen 430, the controller 210 displays the screen 420 associated with public transportation as illustrated in FIG. 6.

The request for displaying a home screen may be made as a user key, such as a double input of a specific key, for displaying a home screen is input, or as after the mobile terminal having stayed in a sleep mode or a standby mode switches to an operation mode, the display 250 is enabled to display a home screen among multiple screens.

As is apparent from the foregoing description, the present invention provides home screens associated with locations of the mobile terminal, to allow the user to quickly run applications appropriate in his/her current location.

While the invention has been shown and described with reference to embodiments thereof, it will be understood by those skilled in the art that various changes in form and details may be made therein without departing from the spirit and scope of the invention as defined by the appended claims and their equivalents.

What is claimed is:

1. A method for displaying a home screen in a mobile terminal, comprising:
   determining a location of the mobile terminal;
   determining a screen associated with the determined location among multiple screens, each of the multiple screens having one or more icons of applications associated with a location; and
   setting the screen associated with the determined location as a home screen,
   wherein the one or more icons of applications associated with the location is set based on a frequency of execution of an application in the location.

2. The method of claim 1, further comprising displaying the set home screen upon receiving a request for displaying a home screen.

3. The method of claim 2, wherein at least one icon of an application, placed by a user, is displayed on the displayed home screen.

4. The method of claim 2, wherein at least one icon of an application having been run in the determined location at least a set number of times, is displayed on the displayed home screen.

5. The method of claim 1, further comprising changing a display order of screens to be displayed following the set home screen.

6. The method of claim 5, wherein the display order of screens is changed depending on a moving path of the mobile terminal.

7. The method of claim 1, wherein an associated set value for the home screen associated with the determined location, is received from an external device.

8. The method of claim 1, wherein an associated set value for the home screen associated with the determined location, is set by a user and stored in the mobile terminal.

9. A mobile terminal for displaying a home screen, comprising:
   a display;
   a Global Positioning System (GPS) module configured to determine a location of the mobile terminal; and
   a controller configured to determine a screen associated with the determined location among multiple screens, each of the multiple screens having one or more icons of applications associated with a location, and to set the screen associated with the determined location as a home screen,
   wherein the controller sets the one or more icons of applications associated with the location based on a frequency of execution of an application in the location.

10. The mobile terminal of claim 9, wherein the controller controls to display the set home screen upon receiving a request for displaying the home screen on the display.

11. The mobile terminal of claim 10, wherein at least one icon of an application, placed by a user, is displayed on the displayed home screen.

12. The mobile terminal of claim 10, wherein at least one icon of an application having been run in the determined location at least a set number of times, is displayed on the displayed home screen.

13. The mobile terminal of claim 9, wherein the controller controls to change a display order of screens to be displayed following the set home screen.

14. The mobile terminal of claim 13, wherein the display order of screens is changed depending on a moving path of the mobile terminal.

15. The mobile terminal of claim 9, wherein an associated set value for the home screen associated with the determined location, is received from an external device.

16. The mobile terminal of claim 9, wherein an associated set value for the home screen associated with the determined location, is set by a user and stored in the memory of the mobile terminal.

* * * * *